July 2, 1935. F. A. HUTCHINSON 2,006,767
TEMPERATURE INDICATING AND CONTROL MECHANISM
Filed April 20, 1934
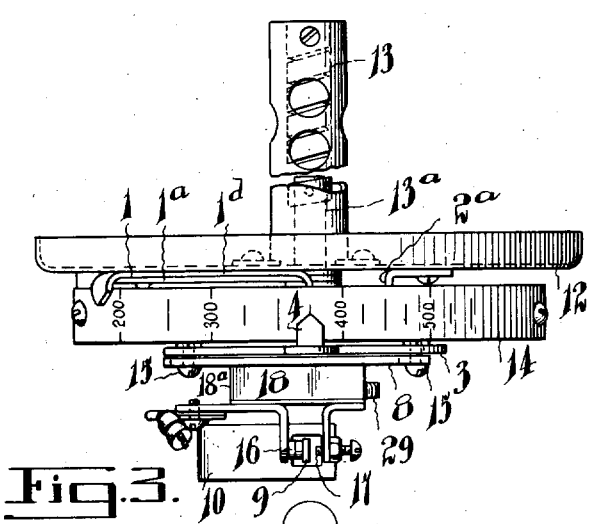
Fig. 3.
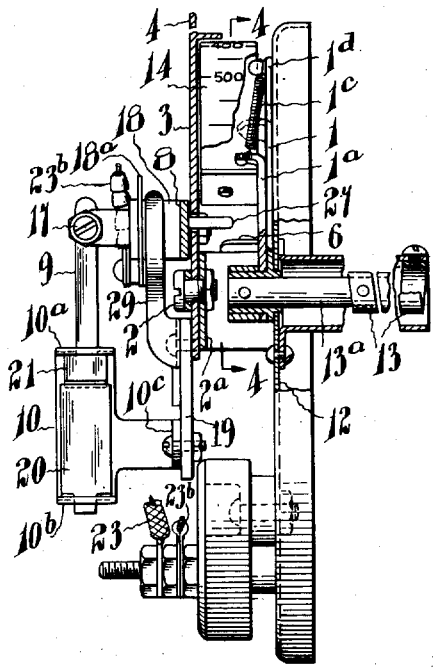
Fig. 2.
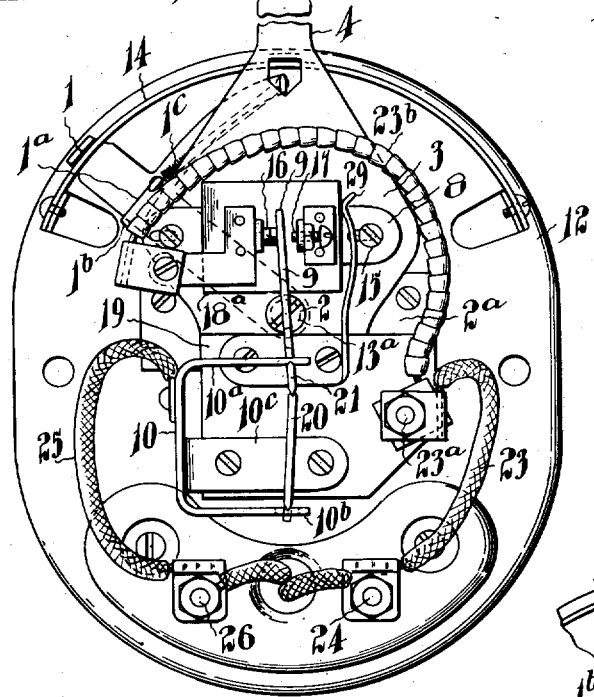
Fig. 1.
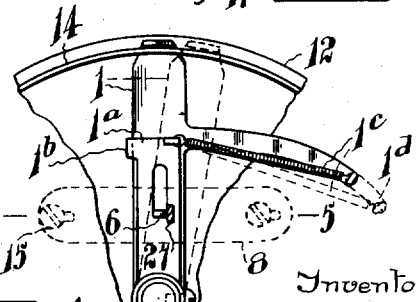
Fig. 5.
Fig. 4.
Inventor
F. A. Hutchinson
by J. Edw. Maybee
ATTY.

Patented July 2, 1935

2,006,767

UNITED STATES PATENT OFFICE 2,006,767

TEMPERATURE INDICATING AND CONTROL MECHANISM

Francis A. Hutchinson, Orillia, Ontario, Canada, assignor to Tudhope Metal Specialties Limited, Orillia, Ontario, Canada Application April 20, 1934, Serial No. 721,456
In Canada September 11, 1933

10 Claims. (Cl. 200—138)

This invention relates to thermostatically controlled mechanism for use with electric heating apparatus to switch a heating element on or off as may be required to attain and maintain a predetermined temperature in the apparatus, and my object is to devise mechanism of this character which will be cheap, simple and reliable.

I attain my object by means of a construction of the mechanism which may be briefly described as follows. On an adjustable regulator is mounted a slide carrying a fixed contact included in the heating circuit. A movable contact, also included in the heating circuit, is mounted on the regulator and is provided with snap over mechanism tending to hold the movable contact in engagement with either the fixed contact or a back stop.

A thermostatically actuated indicator is provided and means whereby the indicator moves the slide one way or the other to make or break the heating circuit according as the temperature is falling or rising.

The invention is hereinafter more specifically described and is illustrated in the accompanying drawing in which Fig. 1 is a front elevation of mechanism constructed in accordance with my invention;

Fig. 2 is a side elevation, partly in section, thereof;

Fig. 3 a plan view;

Fig. 4 a section on line 4—4 in Fig. 2; and

Fig. 5 a section on line 5—5 in Fig. 4.

In the drawing like numerals of reference indicate corresponding parts in the different figures.

Referring to the drawing, 12 is a support, which may, for example, be the rear wall of a casing which is adapted to be secured to a wall of an electrically heated oven. Supported on this part 12 is a thermostatic element 13 of known type which needs no detailed description. To the movable part 13a of this thermostatic element is secured the indicator arm 1. This indicator arm 1 plays over the scale 14 secured to the support 12. The scale will usually be calibrated in degrees of temperature. 3 is the regulator frame, which is pivoted at 2 concentric with the axis of the thermostatic element on a bridge 2a secured to the support 12. This regulator frame is provided with a regulator arm 4, which also plays over the scale 14 and is provided with the usual pointer. On the regulator frame is mounted the slide 8 which is provided with screw and slot guides 15 of known type. This slide moves transversely of the length of the regulator arm 4 and carries the fixed contact 16 and the adjustable back stop 17 of known type. The fixed contact and back stop are insulated from the slide 8 by means of a block 18 and a sheet 18a of insulation.

10 is a U-shaped spring frame which, by means of a lug 10c, is secured to the regulator frame, but is insulated therefrom by the block of insulation 19. 20 is a toggle member having a knife-edge fulcrum on the lower arm 10b of the U-shaped spring frame 10. 9 is a contact arm, the upper end of which is adapted to play between the fixed contact 16 and the back stop 17. The upper part of this arm extends through an opening in the arm 10a of the frame 10, but its lower end 21 is of greater width than the upper end and has a knife-edge fulcrum against the lower side of the arm 10a and a similar fulcrum against the upper end of the toggle member 20 which has the knife-edge fulcrum on the upper side of the lower arm 10b of the frame 10.

The frame 10 maintains a spring tension against the lower end of the toggle member 20 in the direction of its length and the various fulcra are so arranged that a snapover action is obtained as the contact arm 9 plays between the fixed contact 16 and the back stop 17.

23 is a lead connected to the binding post 23a on the block of insulation 19 and 23b is a lead connecting the post with the fixed contact 16. The other end of the lead 23 is connected to the terminal 24 through which connection is made with the circuit to be controlled.

A lead 25 is secured to the frame 10 which is electrically connected with the movable contact arm 9. The other end of this lead is connected with the terminal 26 for connection with the circuit to be controlled.

The back stop 17 is carried on a bracket and the fixed contact 16 is carried by a second bracket, each of these brackets is secured to the sheet of insulation 18a in spaced relationship to one another. It is evident then that, by moving the slide 8 in one direction or the other, the contact arm 9 will snap to one side or the other to make or break a circuit through the leads 23, 23b and 25.

The following mechanism is provided for so moving the slide. The latter is provided with a tang 27 which projects through a slot in the regulator frame 3 and is adapted to be engaged by a projection 6 formed on an arm 1a. This arm is journalled on the part 13a beside the indicator arm 1 and means are provided so that the arm 1a will move with the arm 1 to cause the slide to separate the contacts and hold them separated without preventing the arm 1 from moving past the tang 27 if the temperature of the oven should continue to rise before it drops. This means comprises a lug 1b on the arm 1a and a spring 1c having its opposite ends connected with the arm 1a and with a lateral extension 1d on the arm 1. The spring normally holds the lug 1b in contact with the left side of the arm 1 when the arm 1 is moved clockwise on a rise in temperature so that the arm 1 may continue this movement after the arm 1a is prevented, by means of the projection 6, tang 27, slide 8 and slot guides 15, from continuing with the arm 1. With this arrangement the thermostatic element is free to expand until the temperature of the oven drops and the only extra strain applied to the element is the tensioning of the spring 1c. The slide 8 is constantly urged toward its position for establishing connection between the fixed contact 16 and the contact arm 9 by means of a flat spring 29 having one end secured to the regulator and the other end engaging the block of insulation 18 on the slide 8.

With the parts in the position shown in Fig. 1, the operation is as follows: The indicator arm 1 moves to the right as the temperature rises and the spring 1c causes the arm 1a to move with the arm 1 whereby the projection 6 engages the tang 27 and moves it and thus the slide 8 to the right. This movement of the parts 1a, 6, 27 and 8 is limited by the screw and slot guides 15. The fixed contact thus moves the upper end of the contact arm 9 to the right until the snap-over mechanism comes into action and snaps the contact arm over so that the contact arm 9 engages the back stop 17. The circuit is then broken and remains broken until the thermostatic element moves the indicator arm 1 back to the left. It then, if it has moved farther than the arm 1a, engages the lug 1b thereon and moves the arm 1a with it so that the spring 29 is permitted to move the slide 8 to the left and thus effect a reversal of the position of the movable contact arm 9. Thus the movement of the indicator arm as the temperature rises or falls serves to make or break the circuit which it is desired to control.

From the above description it will be seen that the device is simple in construction, can be cheaply made and will be durable and reliable in action.

What I claim as my invention is:

1. Temperature indicating and control mechanism comprising a thermostatically actuated indicator; a regulator movable relative to the indicator; circuit opening and closing means comprising a slide guided on the regulator to move relative thereto; a fixed contact carried by the slide, a snap-over actuated contact carried by the regulator and movable relative thereto into and out of engagement with the fixed contact; and means operable by the indicator for moving the movable slide to cause the snap-over actuated contact to make or break a circuit in which the contacts are included.

2. Mechanism as set forth in claim 1 in which the slide moving means comprises a tang on the slide, a spring tending to move the slide in one direction to cause the contacts to make the circuit, and a projection movable by the indicator adapted to engage the tang to move the slide in the opposite direction to break the circuit.

3. Temperature indicating and control mechanism comprising a pivotally mounted thermostatically actuated indicator; a regulator pivotally mounted concentric with the indicator; circuit opening and closing means comprising a slide guided on the regulator to move relative thereto, a fixed contact carried by the slide; a snap-over actuated contact carried by the regulator and movable relative thereto into and out of engagement with the fixed contact; and means operable by the indicator for moving the movable slide to cause the snap-over actuated contact to make or break a circuit in which the contacts are included.

4. Temperature indicating and control mechanism comprising a thermostatically actuated indicator; a regulator movable relative to the indicator; circuit opening and closing means comprising a slide movable on the regulator and carrying a fixed contact, a snap-over actuated contact movable on the regulator and including a contact arm pivoted intermediate of its ends and adapted at one end to engage the fixed contact, a back stop for the contact arm, a toggle member at one end pivotally engaging the other end of the contact arm, means for applying spring pressure to the other end of the toggle member in the direction of its length to obtain a snap-over effect on the contact arm between the fixed contact and the back stop; and means whereby the indicator moves the movable slide to make or break a circuit in which the contacts are included.

5. Temperature indicating and control mechanism comprising a thermostatically actuated indicator; a regulator movable relative to the indicator; circuit opening and closing means comprising a slide movable on the regulator and carrying a fixed contact and a back stop; a contact movable on the regulator by and between the fixed contact and the back stop; snap-over mechanism operative on the movable contact adapted when the movable contact is moved by the fixed contact to snap the movable contact into engagement with the back stop and vice versa; means tending to move the slide in one direction to cause the movable contact to engage the fixed contact; and a projection movable by the indicator adapted to actuate the slide in the opposite direction to cause the movable contact to disengage the fixed contact and engage the back stop.

6. Temperature indicating and control mechanism comprising a thermostatically actuated indicator; a regulator movable relative to the indicator; circuit opening and closing means comprising a slide guided on the regulator and movable relative thereto; a fixed contact carried by the slide; a contact carried by the regulator and movable relative thereto into and out of engagement with the fixed contact; and means operable by the indicator for moving the slide to cause the movable contact to engage or disengage the fixed contact and thus make or break a circuit in which the contacts are included.

7. Temperature indicating and control mechanism comprising a thermostatically actuated indicator; a regulator movable relative to the indicator; circuit opening and closing means comprising a slide movable on the regulator and carrying a fixed contact and a back stop spaced therefrom; a U-shaped spring frame carried by the regulator and having two arms; a contact arm; a toggle member having one end pivotally engaging an end of the contact arm, the other end of the toggle member being pivoted on one arm of the U-shaped frame, the contact arm being pivoted intermediate its ends on the other arm of the U-shaped frame, the free end of the contact arm being adapted to be moved by one of the fixed contact and back stop parts to cause it to be snapped into engagement with the other of said parts when the pivotal connection between the contact arm and toggle member is moved past the line of center of the said pivotal connections with the arms of the U frame; and means operable by the indicator for moving the slide and thus the fixed contact and the back stop to actuate the contact arm.

8. Temperature indicating and control mechanism comprising a thermostatically actuated indicator; a regulator movable relative to the indicator; a circuit opening and closing means comprising a slide movable on the regulator and carrying a fixed contact and a back stop spaced therefrom; a contact movable on the regulator by and between the fixed contact and the back stop; snap-over mechanism for actuating the movable contact when the latter is moved by the fixed contact to cause the movable contact to snap into engagement with the back stop and vice versa; means tending to move the slide in one direction to cause the movable contact to engage the fixed contact; means for limiting the movements of the slide; an arm adapted to be moved by the indicator; a projection carried by the arm for moving the slide in the direction opposite that imparted thereto by the last mentioned means to cause the movable contact to disengage the fixed contact and engage the back stop; and a drive connection including a spring between the arm and the indicator for permitting the latter to overrun the arm when the projection has moved the slide to effect the disengagement of the movable and fixed contacts.

9. Temperature indicating and control mechanism comprising a thermostatically actuated indicator; a regulator movable relative to the indicator; circuit opening and closing means comprising a slide guided on and movable relative to the regulator and carrying a fixed contact and a back stop spaced therefrom; a contact carried by the regulator and movable relative thereto by and between the fixed contact and the back stop; and means interposed between the indicator and the slide for actuating the latter to cause the movable contact to engage or disengage the fixed contact and thus make or break a circuit in which the contacts are included.

10. Temperature indicating and control mechanism comprising a thermostatically actuated indicator; a regulator movable relative to the indicator; circuit opening and closing means comprising a slide guided on and movable relative to the regulator and carrying a fixed contact and a back stop spaced therefrom; a contact carried by the regulator and movable relative thereto by and between the fixed contact and the back stop; and means interposed between the indicator and the slide for actuating the latter to cause the movable contact to engage or disengage the fixed contact and thus make or break a circuit in which the contacts are included; and means carried by the slide and regulator for limiting the movements in opposite directions of the slide, the slide actuating means including provisions for permitting the indicator to continue its movement independently of the slide after the circuit is broken.

FRANCIS A. HUTCHINSON.